United States Patent
Deng et al.

(10) Patent No.: US 11,582,922 B2
(45) Date of Patent: Feb. 21, 2023

(54) METHOD FOR PROMOTING GERMINATION OF UNDERGROUND BUDS AND GROWTH OF NEW-BORN ROOT SYSTEMS OF RATOON SUGARCANE

(71) Applicant: Sugarcane Research Institute, Yunnan Academy of Agricultural Sciences, Yunnan (CN)

(72) Inventors: Jun Deng, Yunnan (CN); Yuebin Zhang, Yunnan (CN); Shaolin Yang, Yunnan (CN); Xian Fan, Yunnan (CN); Jingmei Dao, Yunnan (CN); Rudan Li, Yunnan (CN); Yiji Quan, Yunnan (CN)

(73) Assignee: Sugarcane Research Institute, Yunnan Academy of Agricultural Sciences, Yunnan (CN)

( * ) Notice: Subject to any disclaimer, the term of this patent is extended or adjusted under 35 U.S.C. 154(b) by 423 days.

(21) Appl. No.: 16/808,380

(22) Filed: Mar. 4, 2020

(65) Prior Publication Data

US 2020/0196542 A1    Jun. 25, 2020

(30) Foreign Application Priority Data

May 23, 2019  (CN) .......................... 201910434198.7

(51) Int. Cl.
| | | |
|---|---|---|
| *A01G 22/00* | (2018.01) | |
| *A01D 34/01* | (2006.01) | |
| *C05F 3/00* | (2006.01) | |
| *C05F 17/00* | (2020.01) | |

(52) U.S. Cl.
CPC ............. *A01G 22/00* (2018.02); *A01D 34/01* (2013.01); *C05F 3/00* (2013.01); *C05F 17/00* (2013.01)

(58) Field of Classification Search
None
See application file for complete search history.

(56) References Cited

U.S. PATENT DOCUMENTS

| | | | |
|---|---|---|---|
| 8,012,912 B1 * | 9/2011 | Barrick | A01G 22/55 504/165 |
| 2013/0116894 A1 * | 5/2013 | Perez-Iturbe | A01D 41/141 701/50 |
| 2018/0220597 A1 * | 8/2018 | Trenchard | C08K 5/3435 |
| 2018/0295793 A1 * | 10/2018 | Tam | A01G 13/0275 |
| 2020/0323155 A1 * | 10/2020 | Silva | A01H 4/00 |

FOREIGN PATENT DOCUMENTS

| | | |
|---|---|---|
| CN | 103947317 A | 7/2014 |
| CN | 104221649 A | 12/2014 |
| CN | 106489464 A | 3/2017 |
| CN | 106613104 A | 5/2017 |

* cited by examiner

*Primary Examiner* — Wayne A Langel

(57) ABSTRACT

A method for promoting germination of underground buds and growth of new-born root systems of ratoon sugarcane is to cut stubbles based on a depth survey of the stubbles of the ratoon sugarcane, particularly including steps of: for a ratoon sugarcane field after mechanical harvesting, cutting the stubbles with a sugarcane stubble cutting machine, and remaining underground stubbles of 5-7 cm after cutting; for a ratoon sugarcane field with manual harvesting, cutting the sugarcane with a hoe, and remaining underground stubbles of 10-12 cm after cutting, so as to realize sugarcane cutting and stubble cutting in one step; thereafter, applying fertilizers and pesticides, and hilling up, wherein the underground buds of the stubbles are controlled to be distributed 10-15 cm below ground after hilling up; and finally conducting whole film mulching. The present invention is advanced and practical, and easily used and promoted.

5 Claims, No Drawings

METHOD FOR PROMOTING GERMINATION OF UNDERGROUND BUDS AND GROWTH OF NEW-BORN ROOT SYSTEMS OF RATOON SUGARCANE

CROSS REFERENCE OF RELATED APPLICATION

The application claims priority under 35 U.S.C. 119(a-d) to CN 201910434198.7, filed May 23, 2019.

BACKGROUND OF THE PRESENT INVENTION

Field of Invention

The present invention relates to a technical field of sugarcane ratooning, and more particularly to a method for promoting germination of underground buds and growth of new-born root systems of ratoon sugarcane.

Description of Related Arts

The sugarcane is a typical perennial ratoon crop. The ratoon sugarcane occupies the important position in the sugarcane production; in the major sugarcane planting countries of the world, the area of the ratoon sugarcane accounts for more than 50% of the total sugarcane area; the ratoon age limit is generally 1-2 years, but the age limit of 8-10 years or even more than 10 years is also possible. In China, the ratoon age limit of the ratoon sugarcane is generally 2-3 years. The ratoon sugarcane not only has the advantages of labor saving, seed saving and low cost, but also has the superiorities of early growth and fast germination, early tillering, early jointing, long growth cycle, early maturing and high sucrose, and large yield increasing potential.

In the conventional ratoon sugarcane management, after harvesting the sugarcane, the production generally comprises steps of: cleaning the sugarcane field in time (burning the sugarcane leaves and returning to the field, mulching with the sugarcane leaves in alternate rows, or smashing the sugarcane leaves and returning to the field); breaking the ridges, and loosening soil around the stubbles; applying the base fertilizer and the pesticide; mulching with the plastic film; cultivating and managing; and harvesting. Because of polluting the environment and wasting the sugarcane leaf resource, burning the sugarcane leaves and then returning to the field is inappropriate to be promoted and applied. Mulching with the sugarcane leaves in alternate rows can increase the organic matters in the soil and increase the moisture content of the soil, but it is labor-consuming and time-consuming; therefore, it is less applied currently. With the promotion and application of the mechanical harvesting technology, smashing the sugarcane leaves and then returning to the field gradually becomes the major way of sugarcane leaf returning. However, covering the sugarcane ground with the smashed sugarcane leaves is unbeneficial to the subsequent managements of ridge breaking, loosening of the soil around the stubbles, fertilizer and pesticide applying, and plastic film mulching. If meeting the continuous cloudy or rainy days, the smashed sugarcane leaves covering the stubbles easily cause the mildewed and diseased sugarcane stubbles, and the stubbles will become rotten, which seriously affects the stubble quality of the ratoon sugarcane and causes the decreased germination rate and the decreased yield of the ratoon sugarcane of next season.

In recent years, cultivating the strong stubbles has become one of the effective measures to decrease the production cost of the ratoon sugarcane, lengthen the age limit of the ratoon sugarcane, ensures the continuous high yield of the ratoon sugarcane, and continuously increase the income of the sugarcane growers. Currently, there are mainly five technologies to increase the yield of the ratoon sugarcane and lengthen the age limit of the ratoon sugarcane. The first one is the method for lengthening the ratoon age limit of the sugarcane (Chinese patent publication of CN104221649A). The method lengthens the age limit of the ratoon sugarcane through replanting the sugarcane. However, the management thereof is labor-consuming and time-consuming, and thus it is difficult to promote the method under the situation of severe labor shortage. The second one is the management method for the ratoon sugarcane (Chinese patent publication of CN106489464A). With utilizing the stubble cutting and ridge breaking machine, the method successively completes the processes of stubble cutting, fertilizer applying, solution spraying, and mulching. Although the method increases the management efficiency of the ratoon sugarcane, the mulching semi-film has the relatively poor heat preservation and soil moisture conservation effects, which fails to fully tap the stubble potentials of the ratoon sugarcane; moreover, the plastic film is not thick enough, which is unbeneficial to the plastic film recycling treatment. The third one is the method for lengthening the ratoon age limit of the sugarcane. For the plant cane, the method comprises steps of: preparing the virus-free setts, ploughing and preparing the soil, applying the enough base fertilizer and pesticide, laying setts, watering, mulching, conducting the cultivation management such as topdressing and insect prevention, removing the old sugarcane leaves, applying the additional fertilizer, and hilling up. For the ratoon sugarcane, the method comprises steps of: fast-hoeing and low-cutting, cutting the stubbles and loosening the soil around the stubbles, applying the fertilizer and the pesticide, conducting the cultivation management such as film uncovering, watering, fertilizer applying and insect prevention, removing the old sugarcane leaves, applying the additional fertilizer, and hilling up. The method focuses on the management of the plant cane; for the ratoon sugarcane, the smashed old sugarcane leaves (with the diameter smaller than 1 cm) are adopted and then covered with the full film. However, because the sugarcane leaves after smashing are too short, which needs to repeat multiple times of smashing, the mechanical rolling times to the soil are increased, the soil bulk density becomes larger, and the germination of the underground buds and the growth of the new-born root systems of the sugarcane stubbles are inhibited. The fourth one is the cultivation method with deeply cutting the stubbles of the sugarcane (Chinese patent publication of CN106613104A). The method deeply cuts the stubble mechanically or manually, requires an in-soil cutting depth of 2-10 cm, and guarantees that there are 3-5 active buds on the left sugarcane stems. However, the effective method for accurately controlling the germination of the underground buds and the growth of the new-born root systems of the ratoon sugarcane is still not found. Moreover, the method is matched with the other cultivation management measure, belonging to intensive cultivation, which requires the huge amount of manpower and material investment, and has the relatively high production cost. The fifth one is to promote the germination and root system growth of the ratoon sugarcane with adopting the plant growth regulator. The researches show that: treating the ratoon sugarcane stubble with gibberellin and indolebutyric acid has the obvious effects on improving the germination rate, promoting the growth of the seedlings, and increasing the millable canes and the yield; immersing the seeds with ethephon having the appropriate concentration has the obvious promotion effects on the germination and early growth of the sugarcane, and the early germination, large root number, relatively long length, and relatively high activity of the roots. Although the plant growth regulator has the good effect, the production cost is high, so that the method is difficult to be promoted and applied in production.

The main causes which affect the continuous high yield of the ratoon sugarcane are described as follows. The first cause is that sugarcane harvesting is mainly based on manual harvesting. When cutting with the sugarcane cutter, the sugarcane stubbles are easily left on the ground, usually several centimeters higher than the ground, which directly reduces the yield of the ratoon sugarcane and decreases the sucrose content. The inadequate cutting (remaining the high sugarcane stubbles) causes that the activity of the sugarcane stubbles is decreased, the germination of the underground buds of the ratoon sugarcane is greatly reduced, and the germination rate is decreased. The inadequate cutting (remaining the high sugarcane stubbles) causes that the position of the sugarcane stubble base moves up year by year, the root system distribution becomes shallower year by year, and the sugarcane is easily lodged, which affects the normal growth and development of the ratoon sugarcane. The second cause is that the mechanical operation mode is generally introduced for the ratoon sugarcane production, but the usage of the heavy machines easily aggravates soil hardening of the sugarcane field; for the sugarcane field with mechanical harvesting, the broken rate of the ratoon sugarcane is higher than that with manual harvesting; the mechanical damages easily cause the disease infection of the sugarcane stubbles and affect the activity of the sugarcane stubbles. The third cause is that: the conventional methods, which realize the high yield of the ratoon sugarcane and lengthen the ratoon age limit through the stubble cutting technology, fail to solve the problem of keeping the continuous high yield of the ratoon sugarcane and fail to reach the desired effects of the sugarcane growers. Moreover, a part of the conventional technologies have the complex operation, and the sugarcane growers are unwilling to accept it. The fourth cause is that: the sugarcane fields focus on the cultivation of the plant cane and pay little attention to the ratoon sugarcane management, and moreover the management levels of different regions have the relatively large difference, especially in the sugarcane cutting and ratoon management, which causes the low yield of the ratoon sugarcane, the poor ratooning ability and the short age limit of the ratoon sugarcane. The above five methods are all unable to realize the significant progresses on promoting the germination of the underground buds and the growth of the new-born root systems of the ratoon sugarcane, and unable to realize the beneficial effects of cost saving and efficiency increasing of the ratoon sugarcane through improving the yield of the ratoon sugarcane and lengthening the ratoon age limit. Because of the lack of the method for promoting the germination of the underground buds and the growth of the new-born root systems of the ratoon sugarcane, which has advantages of quick effect, advancement, good practicability, easy operation and easy promotion, the stubble quality under the conventional ratoon sugarcane management is not high, and the germination of the underground buds and the growth of the new-born root systems are inhibited, causing the low yield of the ratoon sugarcane and the shortened ratoon age limiting and increasing the sugarcane production cost, which has become the key problem of restricting the high-quality development of the sugarcane industry.

In conclusion, the irregular harvesting way and the low-level ratoon sugarcane management are the main causes of the decreased yield and shortened age limit of the ratoon sugarcane. How to cultivate the strong stubbles and control the rapid germination of the underground buds and the growth of the new-born root systems to the deep soil of the ratoon sugarcane is the main research direction for realizing the continuous high yield of the ratoon sugarcane.

SUMMARY OF THE PRESENT INVENTION

In order to overcome deficiencies in prior art, the present invention provides a method for promoting germination of underground buds and growth of new-born root systems of ratoon sugarcane, which has advantages of quick effect, advancement, good practicability, easy operation and easy promotion, so as to improve a germination rate and a yield of the ratoon sugarcane and lengthen a ratoon age limit.

In order to accomplish above object, the present invention adopts technical solutions as follows.

A method for promoting germination of underground buds and growth of new-born root systems of ratoon sugarcane comprises steps of:

(1) surveying depths of stubbles of the ratoon sugarcane, particularly comprising steps of: for a ratoon sugarcane field after mechanical harvesting, recycling sugarcane leaves, surveying depths of 5-8 stools, and determining an average depth of the stubbles, so as to prepare for mechanical cutting of the stubbles; for a ratoon sugarcane field preparing to adopt manual harvesting, before harvesting, surveying depths of 3-5 stools, and determining an average depth of the stubbles, so as to prepare for in-soil cutting of the ratoon sugarcane;

(2) cutting the stubbles, particularly comprising steps of: for the ratoon sugarcane field after mechanical harvesting, according to the surveyed average depth of the stubbles, cutting the stubbles with a sugarcane stubble cutting machine, and remaining underground stubbles of 5-7 cm after cutting; for the ratoon sugarcane field with manual harvesting, combined with the surveyed average depth of the stubbles, determining an in-soil cutting depth, then cutting the ratoon sugarcane with a sharp hoe, and remaining underground stubbles of 10-12 cm after cutting, so as to realize sugarcane cutting and stubble cutting in one step, and recycling sugarcane leaves;

(3) applying fertilizers and pesticides, particularly comprising steps of: after completing cutting the sugarcane or stubbles, applying a bio-organic fertilizer and a chemical fertilizer as base fertilizers at two sides of the stubbles at one time, wherein the pesticides are uniformly mixed with the chemical fertilizer and applied together; and (4) hilling up and mulching, particularly comprising steps of: hilling up; controlling the underground buds of the ratoon sugarcane to be distributed 10-15 cm below ground after hilling up; and conducting whole film mulching with a plastic film.

According to the present invention, a method used for surveying the stubble depths of the ratoon sugarcane is a diagonal method or a serpentine method, comprising steps of: measuring the depths of the stubbles with a ruler; then calculating the surveyed stubble depths with weighted averaging; and obtaining the average depth of the stubbles.

With the method provided by the present invention, for the ratoon sugarcane field with mechanical harvesting, after completing cutting the stubbles, a paddy sugarcane field completes fertilizer and pesticide applying management in one week, while an irrigated land sugarcane field and a dry land sugarcane field complete the fertilizer and pesticide applying management in time; an application amount of the bio-organic fertilizer is 1800-3000 kg/ha, and an application amount of the chemical fertilizer is 1200-1500 kg/ha, which are both applied at the two sides of the stubbles at one time as the base fertilizers; the pesticides are uniformly mixed with the chemical fertilizer and applied together. For the ratoon sugarcane field with manual harvesting, after recycling the sugarcane leaves, the fertilizer and pesticide applying management is completed in time; an application amount of the bio-organic fertilizer is 1800-3000 kg/ha, and an application amount of the chemical fertilizer is 900-1200 kg/ha, which are both applied at the two sides of the stubbles at one time as the base fertilizers; the pesticides are uniformly mixed with the chemical fertilizer and applied together.

According to the present invention, the chemical fertilizer is a formula compound fertilizer or a bulk blending fertilizer, with an available nutrient content of 40%-52%; for the bio-organic fertilizer, an organic matter content in dry basis is larger than or equal to 40%, a living bacteria count is larger than or equal to 20 million/g, a moisture content is less than or equal to 30%, and pH is 5.5-8.0. The pesticides are 40% chlorantraniliprole·thiamethoxam (20% chlorantraniliprole and 20% thiamethoxam) water dispersible granules or 10% monosultap·clothianidin (9% monosultap and 1% clothianidin) granules. The plastic film is a fully-biodegradable weed-killing plastic film.

Compared with the prior art, the present invention has significant advantages as follows.

Firstly, the present invention promotes the rapid germination of the underground buds of the ratoon sugarcane, and ensures the fast speed and high rate of seedling emergence and the large amount of millable canes of the ratoon sugarcane, which lays the foundation for the high yield of the ratoon sugarcane.

The present invention effectively solves the technical problems caused by the conventional ratoon sugarcane management that: the aboveground buds of the ratoon sugarcane germinate fast, the sugarcane stubbles become mildewed or diseased due to the returned sugarcane leaves caught in the rain, the stubble cutting is inadequate, and the promotion and application are difficult. The present invention develops a technology which integrates accurate stubble cutting with rapid germination of the underground buds of the sugarcane stubbles, so as to facilitate the fast speed and high rate of seedling emergence of the ratoon sugarcane. After years of research, it is found that: the germination of the stubble buds at different depths obviously affects the biomass and the biomass growth rate of the aboveground part of the sugarcane; in seedling emergence, the bud depth of the sugarcane stubbles affects the seedling amount of the ratoon sugarcane; for the ratoon sugarcane with the bud depth in the range of 10-15 cm limited by the present invention, the seedling amount is higher than that with the bud depth of 5-10 cm and 15-20 cm respectively by 12.60% and 5.23%; in the sugarcane biomass, the bud depth of the sugarcane stubbles affects the formation of the biomass of the ratoon sugarcane; for the ratoon sugarcane with the bud depth in the range of 10-15 cm limited by the present invention, the biomass of the aboveground part of the sugarcane is higher than that with the bud depth of 5-10 cm and 15-20 cm. For the ratoon sugarcane with the present invention, the average single-stem weight reaches 1.71 kg, and the number of millable canes reaches 105780 plants/ha; in comparison, for the ratoon sugarcane with the bud depth of 5-10 cm and 15-20 cm, the average single-stem weights are respectively 1.19 kg and 1.51 kg, and the numbers of millable canes are respectively 90015 plants/ha and 95100 plants/ha. In the biomass growth rate of the sugarcane, the appropriate bud depth is beneficial to the rapid growth of the ratoon sugarcane; for the ratoon sugarcane with the bud depth in the range of 10-15 cm limited by the present invention, the biomass growth rate of the aboveground part of the sugarcane is higher than that with the bud depth of 5-10 cm and 15-20 cm, and details are listed in Table 1.

TABLE 1

Influences of different bud depths of sugarcane stubbles on biomass growth rate of aboveground part of ratoon sugarcane

| Bud depth of sugarcane stubble | Biomass growth rate at different time (%) | | | | | |
|---|---|---|---|---|---|---|
| | May 27 | June 26 | July 31 | Aug. 29 | Sep. 29 | Nov. 8 |
| 5-10 cm | 16.43 | 7.89 | 22.19 | 25.32 | 49.55 | 75.00 |
| 10-15 cm | 25.77 | 24.31 | 96.99 | 116.13 | 52.15 | 206.22 |
| 15-20 cm | 42.19 | 18.29 | 74.92 | 92.35 | 66.13 | 178.96 |

Note:
the bud depth of the sugarcane stubble is a depth from the underground buds of the sugarcane stubbles remained after cutting the sugarcane stubbles to the sugarcane field ground after hilling up; in Table 1, for each time of measurement, five stools are selected, and the measurement process repeats for three times; therefore, each date in Table 1 is an average value of fifteen stools; similarly hereinafter.

Secondly, the present invention ensures the growth of the new-born root systems of the ratoon sugarcane stubbles to the deep soil, and enhances the absorption capacities of the new-born root systems to water and nutrient in the soil.

The present invention breaks through the technical difficulties of the conventional ratoon sugarcane management that: the sugarcane stubbles become mildewed or diseased due to the returned sugarcane leaves caught in the rain, the precision management has the high labor amount, the fertilizer application amount is high, the stubble cutting is inadequate, and the promotion and application are difficult. Through combining mechanical operation with manual operation, bundling and recycling of the sugarcane leaves, accurate stubble cutting, fertilizer and pesticide applying, hilling up and mulching with the plastic film are integrated together, which guarantees the growth of the new-born root systems of the ratoon sugarcane to the deep soil, and cultivates the strong new-born root population. After years of research, it is found that: the present invention has the obvious effects on the root systems of the sugarcane, especially on the new-born root systems; the total length, total surface area and total volume of the new-born root systems of the ratoon sugarcane with the present invention all show an increasing trend in the elongation phase of the sugarcane and have the best effect, which are significantly better than that with the conventional ratoon sugarcane management method. It is found by the long-term analysis and research and the field experiments that: the average values of the total length, total surface area and total volume of the new-born root systems of the ratoon sugarcane with the bud depth in the range of 10-15 cm limited by the present invention are all maximum values in August, September and October, and details are listed in Table 2. The above-mentioned illustrates that the present invention has the well-developed new-born root population and establishes the good transportation platform for the new-born root systems of the ratoon sugarcane to absorb the water and nutrient in the soil, as well as ensures the growth of the new-born root systems of the ratoon sugarcane to the deep soil. The total length, total volume and total surface area of the root systems of the ratoon sugarcane are the commonest indexes for evaluating the absorption capacity of the root systems. The relatively long root systems, and the relatively large total surface area and total volume of the root systems are beneficial for the plants to absorb the water and nutrient in the soil in large-scale. Thus, through promoting the growth of the new-born root systems of the ratoon sugarcane to the deep soil and enhancing the absorption of the ratoon sugarcane to the water and nutrient in the soil, the present invention increases the yield of the ratoon sugarcane, and increases the sugarcane planting net benefits of the sugarcane growers and the benefits of the sugar enterprises, which has the good economic and social benefits.

TABLE 2

Influences of different bud depths of sugarcane stubbles on morphological characteristics of root systems of ratoon sugarcane

| Bud depth of sugarcane stubble | Total length of new-born root system (cm/per plant) | | | Total surface area of new-born root system ($cm^2$/per plant) | | | Total volume of new-born root system ($cm^3$/per plant) | | |
|---|---|---|---|---|---|---|---|---|---|
| | Aug. 22 | Sep. 25 | Oct. 31 | Aug. 22 | Sep. 25 | Oct. 31 | Aug. 22 | Sep. 25 | Oct. 31 |
| 5-10 cm | 2713.06 | 2398.82 | 3108.39 | 637.04 | 570.45 | 827.78 | 13.78 | 15.22 | 17.79 |
| 10-15 cm | 3209.58 | 2852.03 | 3928.98 | 853.67 | 671.32 | 1069.05 | 16.60 | 17.24 | 26.68 |
| 15-20 cm | 2016.43 | 2403.87 | 2317.42 | 563.95 | 501.24 | 528.74 | 11.39 | 12.58 | 11.06 |

Thirdly, the present invention enhances the activities of SOD (superoxide dismutase), POD (peroxidase) and NR (nitrate reductase) of the root systems of the ratoon sugarcane, reduces the MDA (malondialdehyde) content of the root systems, and improves the anti-aging capacity of the root systems of the ratoon sugarcane.

The present invention discloses the degradation mechanism of the root systems of the ratoon sugarcane from the perspective of enzymatic activity, and interprets the cause of the relatively short age limit of the ratoon sugarcane from the perspective of root system. SOD and POD is the protective enzymes of the plant cells; in the adverse situation, through strengthening the anti-oxidation of SOD and POD, the resistance of the plants in the adverse situation is improved; NR is a key enzyme inside the plant for transforming the nitrate nitrogen into the ammoniacal nitrogen, and the activity thereof reflects the nitrogen metabolism condition inside the plants, which is significant for improving the nutrient absorption capacity of the root systems. It is found by researches that: for the different bud depths of the ratoon sugarcane stubbles, the enzymatic activities of the sugarcane root systems in the elongation phase have significant difference, and the contents of SOD, POD and NR on the whole are expressed as: late elongation phase>middle elongation phase>early elongation phase; for the root systems of the same phase with the different management measures, the contents of SOD, POD and NR are expressed as: stubbles of 3-5 cm above the ground<stubbles as high as the ground<underground stubbles with the bud depth of 5-10 cm<underground stubbles with the bud depth of 10-15 cm (present invention); moreover, at the same phase, the SOD, POD, and NR of the root systems with the bud depth in the range of 5-15 cm are all greatly better than that with other management measured. MDA is the decomposition product of membrane lipid peroxidation, and is the index for evaluating the membrane lipid peroxidation degree, the aging degree and the reaction strength to the adverse situation of the plant cells. The different bud depths of the ratoon sugarcane have the obvious influences on the MDA content of the root systems; the MDA content of the root systems of the same phase reflects the contrary law to the enzymatic activity, and the MDA content with the bud depth of 10-15 cm (present invention) at different phases are all decreased fastest and are lowest, illustrating that the membrane lipid peroxidation degree of the root cells of the ratoon sugarcane with the present invention is high and has the relatively strong reaction capacity to the adverse situation. The above-mentioned illustrates that the present invention is beneficial to improving the anti-aging capacity of the root systems of the ratoon sugarcane, and enhancing the absorption of the root systems of the ratoon sugarcane to the nutrient in the soil, especially the nitrogen element. Moreover, the present invention has the obvious promotion effect on the sugarcane yield, which lays the foundation for the continuous high yield of the ratoon sugarcane and the extension of the ratoon age limit.

Fourthly, the present invention is beneficial to increasing the utilization efficiency of the sugarcane leaf resource, so as to avoid the "white pollution" caused by the plastic film and protect the ecological environment of the sugarcane field.

The present invention bundles and recycles the larger amount of residual sugarcane leaf resource in the ratoon sugarcane field to be used in feeding and composting, so that the waste in the sugarcane field is reused and turned into treasure, so as to realize the value maximization of the sugarcane leaf resource. Moreover, the present invention prevents the pollution problem caused by directly burning the sugarcane leaves, the extra labor for alternate row mulching and returning of the sugarcane leaves, and the difficult promotion. Even though the smashed sugarcane leaves cannot be all recycled after mechanical harvesting, the residual small amount of smash sugarcane leaves will not cause the mildewed or diseased sugarcane stubbles due to continuous raining, or affect the subsequent ratoon sugarcane management. Through mechanical stubble cutting, the residual small amount of smash sugarcane leaves is also buried into the soil and becomes the organic fertilizer source for soil loosening, so as to improve the soil fertility. Meanwhile, the present invention adopts the fully-biodegradable weed-killing plastic film and the scientific mulching method; through the microorganisms in the soil, the fully-biodegradable weed-killing plastic film is degraded into water and carbon dioxide, which will not pollute the soil, so that the "white plastic film pollution" of the sugarcane field is effectively avoided. Moreover, the plastic film has the function of weed killing, which can decrease the use of the herbicide of the sugarcane field, so as to reduce the investment of the pesticides; and the use of the plastic film for weed killing is an environment-friendly method.

Fifthly, the present invention saves the management labor, reduces the application amount of the chemical fertilizer, decreases the production cost of the ratoon sugarcane, and increases the sugarcane planting benefits of the sugarcane growers, which has obvious economic, social and ecological benefits.

The present invention not only promotes the rapid germination of the underground buds and the growth of the root systems to the deep soil of the ratoon sugarcane and lengthens the age limit of the ratoon sugarcane, but also saves the labor during the management process of the ratoon sugarcane, which is mainly reflected in the managements of cultivating, fertilizer applying, hilling up and mulching of the ratoon sugarcane; for fertilizer applying and hilling up, at least two laborers are saved, and the cost of more than 2400-3600 Yuan/ha is saved. Meanwhile, with applying the formula compound fertilizer or the bulk blending fertilizer at one time, the present invention increases the utilization efficiency of the fertilizer, decreases the application amount of the chemical fertilizer by 300-600 kg/ha, and reduces the investment cost of the chemical fertilizer. The present invention has obvious effects both in labor saving and cost saving, and decreases the production cost of the sugarcane as well as ensures the continuous high yield of the ratoon sugarcane.

DETAILED DESCRIPTION OF THE PREFERRED EMBODIMENT

The present invention is further described in detail with examples as follows.

In the examples, if the technology or condition is not specified, the operation is conducted according to the technology or condition described in references of this field or according to the product specification. The used agricultural machines or tools without indicating the manufacturers are all conventional products can be obtained through purchasing.

Example 1

A method for promoting germination of underground buds and growth of new-born root systems of ratoon sugarcane comprises steps of:

(1) mechanically harvesting, particularly comprising steps of: for a sugarcane field in Longchuan sugarcane area of Dehong Prefecture of Yunnan Province, whose sugarcane variety with paddy field planting is Yuetang 93-159, mechanically harvesting the sugarcane, wherein a harvesting machine is a Case A4000 sugarcane combine harvester;

(2) bundling and recycling sugarcane leaves, particularly comprising steps of: bundling and recycling the smashed sugarcane leaves in the sugarcane field with a LOVOL 9YRZ-1.25A type sugarcane leaf bundler, wherein: most of the sugarcane leaves are used as feed for feeding cows, and the residual small amount of the sugarcane leaves are directly returned to the field;

(3) surveying depths of stubbles of ratoon sugarcane, particularly comprising steps of: for the stubbles left after mechanical harvesting, surveying the depths of 5 stools with a diagonal method and measuring the depths with a tape measure; and obtaining that an average depth of the stubbles is 21 cm;

(4) mechanically cutting the stubbles, particularly comprising steps of: combined with the surveyed average depth of the stubbles, cutting off the stubbles by 15 cm with a sugarcane stubble cutting and ridge breaking machine disclosed in Chinese patent publication of CN103947317A, and remaining underground stubbles of 6 cm; meanwhile, burying the small amount of the smashed sugarcane leaves in the sugarcane field into soil between sugarcane ditches through cutting the stubbles, so as to improve soil fertility and provide convenience for subsequent fertilizer and pesticide applying and mulching; wherein: stubble cutting should be conducted on a sunny day;

for stubble cutting, a suitable sugarcane stubble cutting machine should be selected according to a topography of the sugarcane field and sizes of field blocks; it is appropriate to select a middle-sized sugarcane ridge breaking and stubble cutting machine for a sugarcane field which has a flat topography, large field blocks and regular sugarcane ridges; it is appropriate to select a small-sized sugarcane stubble cutting machine for a sugarcane field which has a relatively steep topography, small field blocks and regular sugarcane ridges; combined with the surveyed average depth of the stubbles, the stubbles are cut, and the underground stubbles of 5-7 cm should be remained after cutting;

(5) applying fertilizers and pesticides, particularly comprising steps of: six days after mechanically cutting the stubbles, conducting a fertilizer and pesticide applying management; applying a bio-organic fertilizer with an application amount of 1800 kg/ha, applying a sugarcane bulk blending fertilizer whose total nutrient content (nitrogen:phosphorous:potassium=25:12:15) is 52% with an application amount of 1200 kg/ha, and applying slow-released low-toxic highly-effective pesticides of 40% chlorantraniliprole and thiamethoxam water dispersible granules with an application amount of 600 g/ha, wherein the pesticides are uniformly mixed with the chemical fertilizer and applied together, and the two fertilizers as base fertilizers are both applied at two sides of the stubbles at one time; wherein:

generally, after mechanically cutting the stubbles, a paddy sugarcane field should complete the fertilizer and pesticide applying management in one week, while an irrigated land sugarcane field and a dry land sugarcane field should complete the fertilizer and pesticide applying management in time; and (6) hilling up and mulching, particularly comprising steps of: after applying the fertilizers and the pesticides, hilling up with a 3ZD7.3-type sugarcane cultivator in time, wherein a hilling-up thickness is 8-10 cm; controlling the underground buds of the ratoon sugarcane to be distributed 10-15 cm below ground after hilling up; and conducting whole film mulching with a fully-biodegradable weed-killing plastic film whose thickness is 0.012 mm, width is 1.5 m, and main component is polylactic acid.

The cultivation management is not conducted subsequently, until the sugarcane is harvested.

Example 2

A method for promoting germination of underground buds and growth of new-born root systems of ratoon sugarcane comprises steps of:

(1) surveying depths of stubbles of the ratoon sugarcane, particularly comprising steps of: for a sugarcane field in Mile sugarcane area of Honghe Prefecture of Yunnan Province, whose sugarcane variety with dry land planting is Yunzhe 05-51, before manual harvesting, surveying the depths of 3 underground stools in the sugarcane field with a diagonal method and measuring the depths with a straight ruler; and obtaining that an average depth of the stubbles is 18 cm;

(2) in-soil cutting the sugarcane and the stubbles, particularly comprising steps of: combined with the surveyed average depth of the stubbles, cutting the sugarcane through a sharp hoe after a disinfection treatment with an in-soil cutting depth of 6-8 cm, and remaining underground stubbles of 10-12 cm, so as to realize sugarcane cutting and stubble cutting in one step; wherein: stubble cutting should be conducted on a sunny day; through cutting with the hoe, the aboveground buds of the stubbles are directly removed, which solves the problem that high sugarcane stubbles affect the plastic film mulching;

(3) bundling and recycling sugarcane leaves, particularly comprising steps of: cleaning the sugarcane field; manually bundling and recycling sugarcane tips and residual old sugarcane leaves respectively, wherein: the sugarcane tips are used for feeding cows; and the old sugarcane leaves are used for composting;

(4) applying fertilizers, particularly comprising steps of: one day after bundling and recycling the sugarcane leaves, conducting a fertilizer applying management; applying a bio-organic fertilizer with an application amount of 3000 kg/ha, and applying a sugarcane formula compound fertilizer whose total nutrient content (nitrogen: phosphorous: potassium=26:12:6) is 44% with an application amount of 1200 kg/ha, wherein the two fertilizers as base fertilizers are both applied at two sides of the stubbles at one time; and (5) hilling up and mulching, particularly comprising steps of: after applying the fertilizers, hilling up with a Jiuling 3ZP-0.8 type sugarcane cultivator-hiller in time, wherein a hilling-up thickness is 3-5 cm; controlling the underground buds of the ratoon sugarcane to be distributed 10-15 cm below ground after hilling up; and conducting whole film mulching with a fully-biodegradable weed-killing plastic film whose thickness is 0.010 mm and width is 2.0 m.

The cultivation management conducted subsequently, until the sugarcane is harvested.

Example 3

A method for promoting germination of underground buds and growth of new-born root systems of ratoon sugarcane comprises steps of: for a sugarcane field in Kaiyuan sugarcane area of Honghe Prefecture of Yunnan Province, whose sugarcane variety with paddy field planting is Yunzhe 08-1609, before manual harvesting, surveying the depths of 5 underground stools in the sugarcane field with a serpentine method and measuring the depths with a straight ruler; obtaining that an average depth of the stubbles is 20 cm; combined with the surveyed average depth of the stubbles, cutting the sugarcane through a sharp hoe after a disinfection treatment with an in-soil cutting depth of 8-10 cm, and remaining underground stubbles of 10-12 cm; cleaning the sugarcane field; manually bundling and recycling sugarcane tips and residual old sugarcane leaves respectively, wherein the sugarcane tips are used for feeding cows, and the old sugarcane leaves are used for composting; two days after bundling and recycling the sugarcane leaves, conducting a fertilizer applying management; applying a bio-organic fertilizer with an application amount of 3000 kg/ha, and applying a sugarcane formula compound fertilizer whose total nutrient content (nitrogen:phosphorous: potassium=26: 12:6) is 44% with an application amount of 1200 kg/ha, wherein the two fertilizers as base fertilizers are both applied at two sides of the stubbles at one time; hilling up with a hiller, wherein a hilling-up thickness is 3-5 cm; controlling the underground buds of the ratoon sugarcane to be distributed 10-15 cm below ground after hilling up; and conducting whole film mulching with a plastic film. The cultivation management is not conducted subsequently, until the sugarcane is harvested.

Example 4

A method for promoting germination of underground buds and growth of new-born root systems of ratoon sugarcane comprises steps of: for a sugarcane field in Longchuan sugarcane area of Dehong Prefecture of Yunnan Province, whose sugarcane variety with irrigated land planting is ROC 22, mechanically harvesting the sugarcane; bundling and recycling the smashed sugarcane leaves in the sugarcane field with a sugarcane leaf bundler, wherein a small amount of the sugarcane leaves are directly returned to the field; for the stubbles left after mechanical harvesting, surveying the depths of 6 stools with a serpentine method, and obtaining that an average depth of the stubbles is 20 cm; combined with the surveyed average depth of the stubbles, cutting off the stubbles by 15 cm with a sugarcane stubble cutting and ridge breaking machine, and remaining underground stubbles of 5 cm; meanwhile, burying the small amount of the smashed sugarcane leaves in the sugarcane field into soil between sugarcane ditches through cutting the stubbles; five days after mechanically cutting the stubbles, watering with an amount of 90 ton/ha; on the second day of watering, conducting a fertilizer and pesticide applying management; applying a sugarcane bulk blending fertilizer whose total nutrient content (nitrogen:phosphorous:potassium=27:5:10) is 42% with an application amount of 1500 kg/ha, applying a bio-organic fertilizer with an application amount of 2400 kg/ha, and applying slow-released low-toxic highly-effective pesticides of 40% chlorantraniliprole and thiamethoxam water dispersible granules with an application amount of 600 g/ha, wherein the pesticides are uniformly mixed with the chemical fertilizer and applied together, and the two fertilizers as base fertilizers are both applied at two sides of the stubbles at one time; thereafter, hilling up with a sugarcane ridger in time, wherein a hilling-up thickness is about 10 cm; controlling the underground buds of the ratoon sugarcane to be distributed 10-15 cm below ground after hilling up; and conducting whole film mulching with a plastic film. The cultivation management is not conducted subsequently, until the sugarcane is harvested.

Example 5

A method for promoting germination of underground buds and growth of new-born root systems of ratoon sugarcane comprises steps of: for a sugarcane field in Yingjiang sugarcane area of Dehong Prefecture of Yunnan Province, whose sugarcane variety with dry land planting is Yingyu 91-59, mechanically harvesting the sugarcane; bundling and recycling the smashed sugarcane leaves in the sugarcane field, wherein a small amount of the sugarcane leaves are directly returned to the field; for the stubbles left after mechanical harvesting, surveying the depths of 8 stools with a diagonal method, and obtaining that an average depth of the stubbles is 16 cm; combined with the surveyed average depth of the stubbles, cutting off the stubbles by 10 cm with a sugarcane stubble cutting and ridge breaking machine, and remaining underground stubbles of 6 cm; meanwhile, burying the small amount of the smashed sugarcane leaves in the sugarcane field into soil between sugarcane ditches through cutting the stubbles; three days after mechanically cutting the stubbles, irrigating with alcoholic wastewater, wherein an irrigation amount is 150 ton/ha; after two days of alcoholic wastewater irrigation, conducting a fertilizer and pesticide applying management; applying a sugarcane bulk blending fertilizer whose total nutrient content (nitrogen:phosphorous:potassium=25:12:15) is 52% with an application amount of 1200 kg/ha, and applying slow-released low-toxic highly-effective pesticides of 40% chlorantraniliprole and thiamethoxam water dispersible granules with an application amount of 600 g/ha, wherein the pesticides are uniformly mixed with the chemical fertilizer and applied together, and the chemical fertilizer as the base fertilizer is applied at two sides of the stubbles at one time; thereafter, hilling up in time, wherein a hilling-up thickness is about 9 cm; controlling the underground buds of the ratoon sugarcane to be distributed 10-15 cm below ground after hilling up; and conducting whole film mulching with a plastic film. The cultivation management is not conducted subsequently, until the sugarcane is harvested.

Example 6

A method for promoting germination of underground buds and growth of new-born root systems of ratoon sugarcane comprises steps of: for a sugarcane field in Gengma sugarcane area of Lincang Prefecture of Yunnan Province, whose sugarcane variety with dry land planting is Guiliu 05-136, mechanically harvesting the sugarcane; bundling and recycling the smashed sugarcane leaves in the sugarcane field with a bundler, wherein a small amount of the sugarcane leaves are directly returned to the field; for the stubbles left after mechanical harvesting, surveying the depths of 5 stools with a diagonal method, and obtaining that an average depth of the stubbles is 18 cm; combined with the surveyed average depth of the stubbles, cutting off the stubbles by 11 cm with a stubble cutting machine, and remaining underground stubbles of 7 cm; meanwhile, burying the small amount of the smashed sugarcane leaves in the sugarcane field into soil between sugarcane ditches through cutting the stubbles; one day after mechanically cutting the stubbles, applying a bio-organic fertilizer with an application amount of 1800 kg/ha, applying a sugarcane formula compound fertilizer whose total nutrient content (nitrogen:phosphorous:potassium=26:12:6) is 44% with an application amount of 1200 kg/ha, and applying 10% monosultap and clothianidin granules with an application amount of 45 kg/ha, wherein the pesticides are uniformly mixed with the chemical fertilizer and applied together, and the two fertilizers as base fertilizers are both applied at two sides of the stubbles at one time; thereafter, hilling up in time, wherein a hilling-up thickness is about 9 cm; controlling the underground buds of the ratoon sugarcane to be distributed 10-15 cm below ground after hilling up; and conducting whole film mulching with a plastic film. The cultivation management is not conducted subsequently, until the sugarcane is harvested.

Example 7

A method for promoting germination of underground buds and growth of new-born root systems of ratoon sugarcane comprises steps of: for a sugarcane field in Lancang sugarcane area of Pu'er Prefecture of Yunnan Province, whose sugarcane variety with dry land planting is ROC 22, before manual harvesting, surveying the depths of 5 underground stools in the sugarcane field with a serpentine method, and obtaining that an average depth of the stubbles is 15 cm; combined with the surveyed average depth of the stubbles, cutting the sugarcane through a sharp hoe after a disinfection treatment with an in-soil cutting depth of 3-5 cm, and remaining underground stubbles of 10-12 cm, after manual harvesting, cleaning the sugarcane field; applying a bio-organic fertilizer with an application amount of 1800 kg/ha, applying a sugarcane coated slow-released formula bulk blending fertilizer whose total nutrient content (nitrogen:phosphorous: potassium=24:6:10) is 40% with an application amount of 900 kg/ha, and applying 10% monosultap and clothianidin granules with an application amount of 45 kg/ha, wherein the pesticides are uniformly mixed with the chemical fertilizer and applied together, and the two fertilizers as base fertilizers are both applied at two sides of the stubbles at one time; hilling up, wherein a hilling-up thickness is 3-5 cm; controlling the underground buds of the ratoon sugarcane to be distributed 10-15 cm below ground after hilling up; and conducting whole film mulching with a plastic film. The cultivation management is not conducted subsequently, until the sugarcane is harvested.

The used chemical fertilizer in the present invention is a formula compound fertilizer or a bulk blending fertilizer, with an available nutrient content of 40%-52%, which can be directly purchased from the market. For the bio-organic fertilizer, an organic matter content (in dry basis) is larger than or equal to 40%, a living bacteria count is larger than or equal to 20 million/g, a moisture content is less than or equal to 30%, and pH is 5.5-8.0. The bio-organic fertilizer can be purchased from the market or prepared by oneself. For the pesticides, appropriate highly-effective low-toxic pesticides should be selected according to the specific pest and disease conditions.

The present invention is able to promote the rapid germination of the underground buds of the ratoon sugarcane stubbles, and ensure the fast speed, high rate and uniformity of seedling emergence of the ratoon sugarcane. Moreover, the present invention ensures the growth of the new-born root systems of the ratoon sugarcane stubbles to the deep soil, and enhances the absorption capacities of the new-born root systems to water and nutrient in the soil. Furthermore, the present invention enhances the activities of SOD (superoxide dismutase), POD (peroxidase) and NR (nitrate reductase) of the root systems of the ratoon sugarcane, reduces the MDA (malondialdehyde) content of the root systems, and improves the anti-aging capacity of the root systems of the ratoon sugarcane. Meanwhile, the present invention saves the management labor, reduces the application amount of the chemical fertilizer, and decreases the production cost of the ratoon sugarcane.

What is claimed is:
1. A method for promoting germination of underground buds and growth of new-born root systems of ratoon sugarcane, the method comprising steps of:
 (1) surveying depths of stubbles of the ratoon sugarcane through diagonal method or serpentine method, which comprises:
  for a ratoon sugarcane field after mechanical harvesting, recycling sugarcane leaves, surveying depths of 5-8 stools, and determining an average depth of the stubbles by weighting the surveyed depths of the 5-8 stools, so as to prepare for mechanical cutting of the stubbles;
  for a ratoon sugarcane field preparing to adopt manual harvesting, before harvesting, surveying depths of 3-5 stools, and determining an average depth of the stubbles by weighting the surveyed depths of the 3-5 stools, so as to prepare for in-soil cutting of the ratoon sugarcane;

(2) performing stubble cutting, which comprises:
for the ratoon sugarcane field after mechanical harvesting, according to the average depth of the stubbles, remaining underground stubbles of 5-7 cm after cutting the stubbles with a sugarcane stubble cutting machine;
for the ratoon sugarcane field with manual harvesting, combined with the average depth of the stubbles, determining an in-soil cutting depth, remaining underground stubbles of 10-12 cm after cutting the ratoon sugarcane with a sharp hoe, so as to realize sugarcane cutting and stubble cutting in one step, and recycling sugarcane leaves;
(3) applying fertilizers and pesticides, which comprises:
for the ratoon sugarcane field with mechanical harvesting, after completing the stubble cutting, a paddy sugarcane field completing fertilizer and pesticide applying management in one week, an irrigated land sugarcane field and a dry land sugarcane field completing the fertilizer and pesticide applying management in time, wherein an application amount of bio-organic fertilizer is in a range of 1800-3000 kg/ha, an application amount of chemical fertilizer is in a range of 1200-1500 kg/ha, the bio-organic fertilizer and the chemical fertilizer are both applied to two sides of the stubbles as base fertilizers at one time; the pesticides are uniformly mixed with the chemical fertilizer and applied together;
for the ratoon sugarcane field with manual harvesting, after recycling the sugarcane leaves, completing the fertilizer and pesticide applying management in time, wherein the application amount of the bio-organic fertilizer is in a range of 1800-3000 kg/ha, the application amount of the chemical fertilizer is in a range of 900-1200 kg/ha, the bio-organic fertilizer and the chemical fertilizer are both applied to the two sides of the stubbles as base fertilizers at one time; the pesticides are uniformly mixed with the chemical fertilizer and applied together; and
(4) hilling up, and then controlling the underground buds of the ratoon sugarcane to be distributed 10-15 cm below ground, and then conducting whole film mulching with a plastic film.

2. The method according to claim 1, wherein the chemical fertilizer is a formula compound fertilizer or a bulk blending fertilizer, with an available nutrient content of 40%-52%.

3. The method according to claim 2, wherein for the bio-organic fertilizer, an organic matter content in dry basis is larger than or equal to 40%, a living bacteria count is larger than or equal to 20 million/g, a moisture content is less than or equal to 30%, and pH (potential of hydrogen) is in a range of 5.5 to 8.0.

4. The method according to claim 3, wherein the pesticides are 40% chlorantraniliprole and thiamethoxam water dispersible granules or 10% monosultap and clothianidin granules.

5. The method according to claim 4, wherein the plastic film is a fully-biodegradable weed-killing plastic film.

* * * * *